United States Patent [19]
Fletcher et al.

[11] 3,802,779
[45] Apr. 9, 1974

[54] METHOD AND APPARATUS FOR OPTICALLY MONITORING THE ANGULAR POSITION OF A ROTATING MIRROR

[76] Inventors: James C. Fletcher, Administrator of the National Aeronautics and Space Administration with respect to an invention of; Jack C. Lansing, Jr., 1616 Loma St., Santa Barbara, Calif. 93103; Richard W. Cline, 7321 Padova Dr., Goleta, Calif.

[22] Filed: June 6, 1972

[21] Appl. No.: 260,241

[52] U.S. Cl............ 356/152, 250/231 SE, 350/299
[51] Int. Cl. .......................................... G01b 11/26
[58] Field of Search................... 356/138, 149, 152; 250/235, 231 SE; 350/299

[56] References Cited
UNITED STATES PATENTS
3,708,231  1/1973  Walters.............................. 356/152

Primary Examiner—Maynard R. Wilbur
Assistant Examiner—S. C. Buczinski
Attorney, Agent, or Firm—R. F. Kampf; John R. Manning

[57] ABSTRACT

An optical system monitors the angular position of a rotating scanning mirror to indicate the effective start and end of each scan. At a certain angular position, a ray of energy transmitted to the mirror is reflected a plurality of times between the reflectors associated with the optical system and the line on the mirror parallel to the axis thereof, and then to a detector to sense that angular position. A single optical system may be arranged to sense a plurality of different angular positions for each revolution of the mirror.

10 Claims, 3 Drawing Figures

METHOD AND APPARATUS FOR OPTICALLY MONITORING THE ANGULAR POSITION OF A ROTATING MIRROR

ORIGIN OF THE INVENTION

The invention described herein was made in the performance of work under a NASA contract and is subject to the provisions of Section 305 of the National Aeronautics and Space Act of 1958, Public Law 85-568 (72 STAT 435; 42 U.S.C. 2457).

BACKGROUND OF THE INVENTION

This invention relates to optical monitoring of the angular position of a rotating mirror. More particularly, it relates to a method and apparatus for determining certain angular positions of a rotating scanning mirror.

A scan mirror for a multi-spectral scanner rotates at approximately 300° per second. It is necessary to determine the position of the scan mirror to an accuracy of two seconds of arc. Due to small uncertainties in the motion of the scan mirror, it is essential to use a scan mirror position monitor to indicate the effective start and end of each scan. Existing devices for monitoring the angular position of rotating members are either too slow or not sufficiently precise.

SUMMARY OF THE INVENTION

Thus, it is a purpose of the present invention to provide a new and improved method and apparatus for monitoring the angular position of a rotating mirror rapidly with a high degree of precision.

This purpose of the invention is achieved by providing an arrangement wherein a ray of energy such as a light beam is transmitted to the mirror and caused to reflect off of the mirror a plurality of times, always along a line on the surface of the mirror which is parallel to the axis of rotation thereof, the ray finally being received by a detector.

In a preferred embodiment the device uses a three-faceted folding mirror to accomplish an optical path eight times the separation between the rotating mirror and the position monitor device. The arrangement described senses the angular position three times each revolution, e.g., at angular positions, $\theta_1$, $\theta_2$ and $\theta_3$. Similarly, a device employing a five-faceted folding mirror would sample the rotational position five times each revolution. The positional information can be combined with timing data to determine angular rate.

In the preferred embodiment, a precise angular position $\theta$ of the rotating mirror will cause the energy bundle to reflect at a certain three zones on the plane folding mirrors. At position $\theta_2$ the energy bundle will reflect at three other zones and at position $\theta_3$ at three other zones.

The use of multiple reflections from the scanning mirror achieves a substantial increase in the scan mirror angular detection sensitivity. In a simple design with a single reflection having separation from the moving mirror to the detector of $d$, the linear displacement $S$ caused by rotation through $\Delta \theta$ is $S = 2d\theta$. With the system illustrated the displacement $S = 32 \, d \, \Delta\theta$ or a 16 times increase in available resolution. Although systems utilizing multiple reflections may have been employed before, the concept of multiple reflection being used at multiple positions is believed to be new. The slight vertical inclination of the system causes the ray bundles to "walk" thereby clearing the image from the mirror system.

Thus, it is an object of this invention to provide a new and improved method and apparatus for monitoring the angular position of a rotating mirror which is more sensitive, more rapid, functional at multiple angles and/or has a high degree of precision.

It is another object of this invention to provide a concept of faceted folding mirror design that creates an effective multiplication of the angular motion of an optical beam.

It is another object of this invention to provide a concept for a faceted folding mirror that provides for detection at several angular positions.

It is another object of this invention to provide a high frequency multiple reflection monitoring method and apparatus for a rotating mirror.

Other objects and the advantages of the present invention will become apparent from the detailed description to follow, together with the accompanying drawings.

BRIEF DESCRIPTION OF THE DRAWINGS

There follows a detailed description of preferred embodiments of the invention to be read together with the accompanying drawings.

DETAILED DESCRIPTION OF THE PREFERRED EMBODIMENTS

Figure 1:
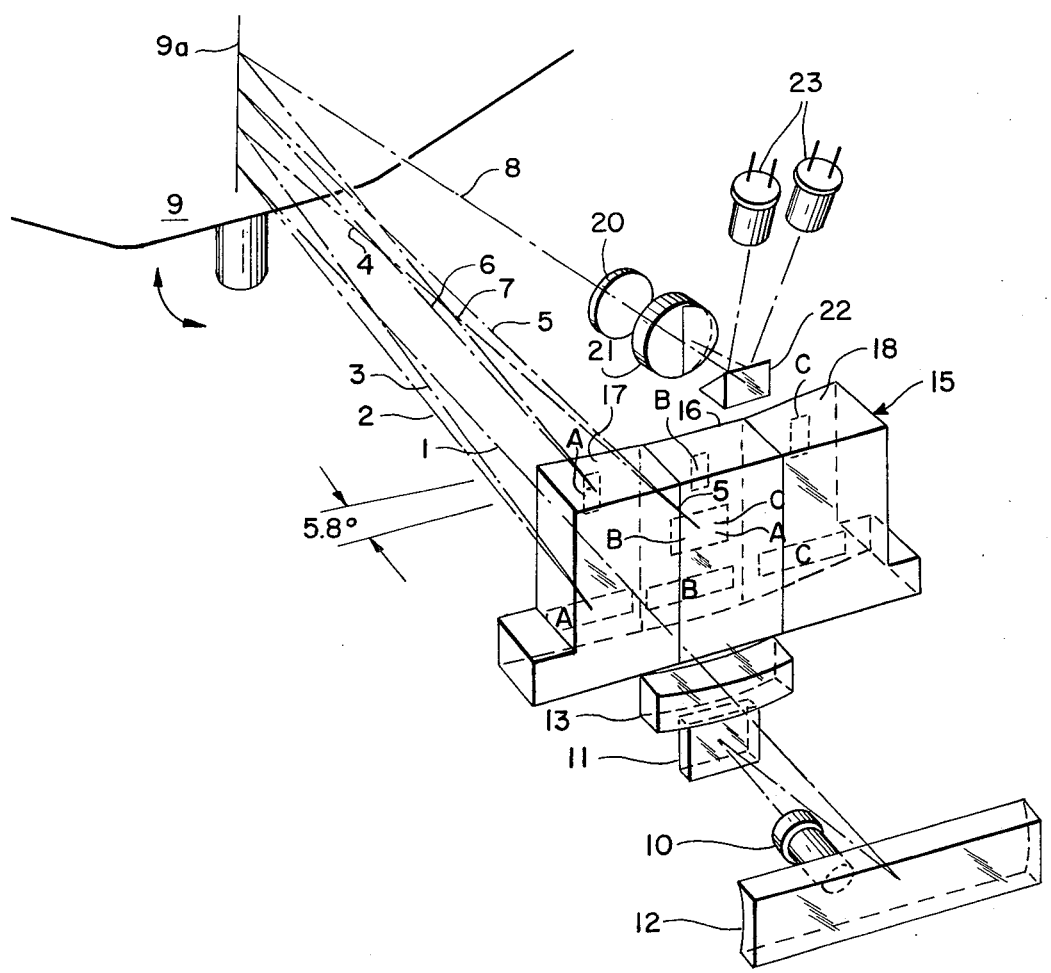
FIG. 1 is a diagrammatic view of a preferred embodiment of the invention.

Referring now to the drawings, like elements are represented by like numerals throughout the several views.

In the preferred embodiment, three angular positions $\theta_1$, $\theta_2$, and $\theta_3$ are sensed. At $\theta_1$ the rotating mirror will cause the energy bundle to reflect at the three zones identified as A on the folding mirror 15 in FIG. 1. At $\theta_2$, the three zones B are employed and at position $\theta_3$ the three zones C are employed.

Figure 3:
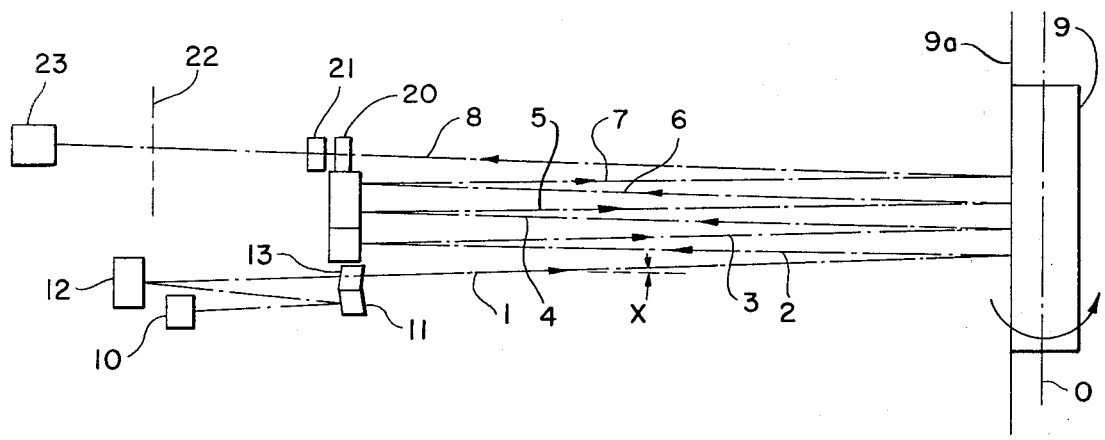
FIG. 3 is an optical schematic view, viewing the system of FIG. 1 from side elevation.

Referring to the figures, there is shown a scanning mirror 9 and an imaginary vertical line 9a. This line may be the axis of rotation of the scanning mirror 9 or the axis may be spaced from but parallel to this line 9a. Continuous incoherent radiation is emitted from the gallium arsenide (GaAs) diode 10. Energy is reflected by a suitable plane folding mirror 11 to a primary mirror 12 and then through a meniscus lens 13 to the line 9a on the mirror. This emitted ray is designated by the numeral 1 in all of the figures. As is evident from FIG. 3, this ray is inclined upwardly by the angle X.

Figure 2:
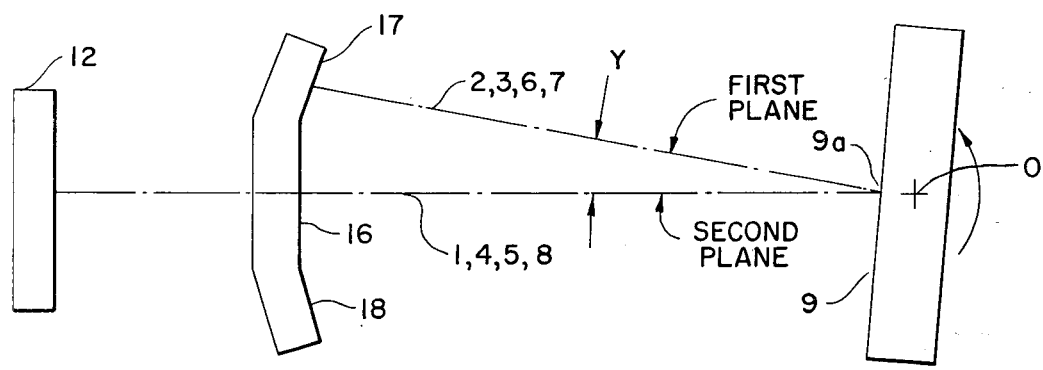
FIG. 2 is an optical schematic view viewing the system of FIG. 1 from above.

The monitoring device is intended to sense certain precise angular locations of the mirror. The rotating scanning mirror has an angular scan interval of approximately 5.8 degrees. That is, the mirror could be precisely perpendicular to the vertical plane including the ray 1, or it could be turned about its axis in either direction by approximately 2.9°. When turned by said 2.9° clockwise, as viewed in FIG. 2, it is at position $\theta_1$ which is illustrated in the figures and whereat zones A are used. When perpendicular to the vertical plane with ray 1 it will be at $\theta_2$ using zones B and when at 2.9° in the counterclockwise direction it will be at $\theta_3$ using zones C. In the illustrated position $\theta_1$, the ray 1 upon reaching the line 9a is reflected not directly back toward the emitter in the same plane, but rather to one side thereof through the angle Y which equals 5.8°. The first deflected ray, indicated by the numeral 2 in the figures, in addition to being deflected through the horizontal angle Y is deflected upwardly through the vertical angle X as shown most clearly in FIG. 3. The vertical plane passing through the ray section 2 and through the line 9a will be referred to hereinafter as the first plane, and the vertical plane passing through the ray 1 and the line 9a will be referred to hereinafter as the second plane.

Above the lens 13 the plane folding mirror 15 has three separate reflecting surfaces, 16, 17, and 18, all facing the mirror 9. The zones A, B and C are shown on these surfaces 16, 17 and 18. All three reflecting surfaces are vertical, the reflecting surface 16 being perpendicular to the said second plane and the surface 17 being perpendicular to the first plane. The reflecting surface 18 is not utilized at the precise position $\theta_1$ of the apparatus as shown in the views. However, if the mirror 9 were positioned at $\theta_3$ at the opposite (counterclockwise as viewed in FIG. 2) extreme of its scan interval, the reflected ray section 2 would be directed to surface 18 rather than surface 17 and the said first plane would be perpendicular to the surface of 18 rather than the surface of 17, whereby zones C would be used.

As is evident from the figures, after the ray section 2 is reflected by the surface 17, the ray follows the following path; ray section 3 within the first plane to the line 9a, ray section 4 to the mirror 16 within the second plane, ray section 5 back to the line 9a also within the second plane, ray section 6 back to the mirror 17 within the first plane, ray section 7 back to the line 9a in the first plane, and finally ray section 8 in the second plane to the detector. As is evident from FIGS. 2 and 3, the reflections off the line 9a of the mirror alternates the sections back and forth between the two planes while the reflecting surfaces 16 and 17 reflect the ray sections back to the mirror within the same planes. All reflected rays are inclined upwardly by the angle X. In angular position $\theta_2$, zones B are used. Here the consecutive reflected rays "walk" up each time by an angle X, but they are not concurrently reflected sideways by the angle Y.

Referring again to the illustrated position $\theta_1$, detected ray section 8 is received through a filter 20 by a plane convex lens 21 having a 30° prism thereon, this lens splitting the received ray, the two portions thereof being deflected by the diagonal reflector 22 to a pair of deflectors 23.

While it is a main feature of the present invention that at any one angular position of the mirror there be at least two reflections off of the line 9a of the mirror, it will be evident that there need not be precisely eight ray sections as shown in the figures. For example, reflecting surface 16 could be omitted and the detector lowered to receive the ray section 4. Alternately, the reflecting surfaces 16, 17 and/or 18 could be made much taller and the detecting means raised vertically so that following the ray section 8 the ray could be deflected again back to the mirror for at least two additional reflections off of the mirror before reaching the detecting means.

In practice, as the mirror rotates, each one of the positions $\theta_1$, $\theta_2$, and $\theta_3$ would be sensed in succession.

Although the invention is not limited to the precise angles shown herein, in one preferred arrangement, the angle X would be approximately 1° to 2°.

The present apparatus could also operate in a DC mode.

To electrically process the error signal, two silicon photodiode detectors are employed with bias voltage in opposite directions. The output from the detectors is summed with critical detection occurring at the zero crossing between the positive going signal and the negative going signal. Electrical signal processing includes gating and triggering so as to have extremely low false alarm probability.

Although the invention has been described in considerable detail with respect to the preferred embodiments thereof, it will be apparent that the invention is capable of numerous modifications and variations apparent to those skilled in the art without departing from the spirit and scope of the invention.

We claim:

1. A device for monitoring the angular position of a rotating mirror comprising:
    means for emitting a ray of energy to a first point on the mirror such that the ray is reflected therefrom, a reflecting means for receiving the said reflected ray and for reflecting it at least one additional time back to the mirror to a point thereon, which point forms a line with the first said point, the line being parallel to the axis of rotation of the mirror, the said reflections of the ray to and from the reflecting means thus lying in a common plane, detection means for detecting the said ray after the last reflection off of the said line of the mirror, said detection means positioned to receive and detect at one location the last reflected ray only when the mirror is at certain of a plurality of angular positions relative to its axis of rotation, and wherein said emitter, said reflecting means and said mirror are arranged such that all reflections of the ray between the emitted and the last deflected ray are inclined vertically by an angle X.

2. A device according to claim 1, wherein, in at least one of said angular positions the said reflections from the rays to and from the reflecting means lie in a first common plane, the said emitted and last reflected ray lie in a second common plane, the said first and second common plane intersecting at the said line on the mirror and forming an angle Y between them, and wherein each time the ray is deflected off of the said mirror, it is deflected about said angle Y from one of said planes to the other.

3. A device according to claim 2, including a further reflecting means for receiving certain deflected rays from the line of the mirror in the second plane and for reflecting such deflected rays back to the mirror and into the first plane;
    the device positioned to reflect the emitted ray at least seven times at each angular position to form eight straight ray sections, in sequence, between and inclusive of the emitted and detected sections, said eight sections including:
    a first ray section being the said emitted ray, second and third ray sections from the line of the mirror to the said reflecting means and back to the line of the mirror, fourth and fifth ray sections from the line of the mirror to the said further reflecting means and back to the line of the mirror, sixth and seventh ray sections from the line of the mirror back to the said reflecting means and back to the line of the mirror, and the eighth ray section being the last said ray from the line of the mirror to the detection means, and wherein, in those angular positions in which the ray sections lie in said first and second planes, said first, fourth, fifth and eighth ray sections lie in the said second plane and the said second, third, sixth and seventh ray sections lying in the first plane.

4. A device according to claim 3, said reflector means and said further reflector means comprising a plane folding mirror having a first reflector surface parallel to the first plane and constituting said reflector means, and a second reflector surface parallel to the second plane and constituting said further reflector means, and said means for emitting and detecting the light ray located on opposite sides of the second reflecting surface in said second plane.

5. A device according to claim 4, said emitting means comprising a high frequency GaAs emitter, said detector means including a prism arranged to split the said last ray into two sections and including a detector device for detecting each section.

6. A device according to claim 1, said emitting means comprising a GaAs emitter.

7. A device according to claim 2, wherein the angle between the said first and second planes is 5.8°.

8. A method for monitoring the angular position of a rotating mirror comprising:

transmitting an energy ray to a line on the mirror, which line is parallel to the axis of rotation of the mirror, said ray being inclined relative to the said mirror line at an angle X and forming with said mirror line a common plane, reflecting this ray from the mirror line at least one additional time back to the mirror line, the reflections of the ray to and from the reflecting means thus lying in a common plane, detecting the said ray at one location after the last reflection off of said mirror line only when the mirror is at certain ones of a plurality of angular positions relative to the axis of rotation of the mirror, thus detecting said angular positions, and each of the reflected rays between the emitted and the last said ray, inclusive, being inclined at an angle X relative to a plane passing perpendicularly to the axis of rotation.

9. The method of claim 8, in which in at least one of said certain angular positions the said common plane of the rays from the mirror to the reflecting means and back to the mirror form a first plane, the said emitted ray and the said last reflected ray forming a second plane, the two planes intersecting at said mirror line.

10. The method of claim 9 including receiving the ray when first deflected back into the second plane, and re-deflecting this ray back to the line of the mirror, and hence into the first plane away from and back to the mirror and then from the mirror back into the second plane in the same manner as the first said deflection of the ray.

* * * * *